(12) United States Patent
Lee et al.

(10) Patent No.: US 11,027,224 B2
(45) Date of Patent: Jun. 8, 2021

(54) DEVICE FOR COLLECTING AIR ACCUMULATED IN PIPE

(71) Applicant: KOREA HYDRO & NUCLEAR POWER CO., LTD., Gyeongsangbuk-do (KR)

(72) Inventors: Seung Chan Lee, Daejeon (KR); Duk Joo Yoon, Daejeon (KR); Sang Jun Ha, Daejeon (KR)

(73) Assignee: KOREA HYDRO & NUCLEAR POWER CO., LTD., Gyeongsangbuk-do (KR)

( * ) Notice: Subject to any disclaimer, the term of this patent is extended or adjusted under 35 U.S.C. 154(b) by 0 days.

(21) Appl. No.: 16/075,137

(22) PCT Filed: Feb. 24, 2016

(86) PCT No.: PCT/KR2016/001777
§ 371 (c)(1),
(2) Date: Aug. 2, 2018

(87) PCT Pub. No.: WO2017/135494
PCT Pub. Date: Aug. 10, 2017

(65) Prior Publication Data
US 2018/0369719 A1 Dec. 27, 2018

(30) Foreign Application Priority Data
Feb. 2, 2016 (KR) .................. 10-2016-0012620

(51) Int. Cl.
*F16K 15/14* (2006.01)
*B01D 19/00* (2006.01)
(Continued)

(52) U.S. Cl.
CPC ......... *B01D 19/0063* (2013.01); *B01D 19/00* (2013.01); *F16K 15/144* (2013.01);
(Continued)

(58) Field of Classification Search
CPC ......... Y10T 137/2931; Y10T 137/3003; Y10T 137/3084; Y10T 137/309; Y10T 137/3093;
(Continued)

(56) References Cited

U.S. PATENT DOCUMENTS 2,880,758 A * 4/1959 Mercier .................... F15B 1/18
138/30
3,093,001 A * 6/1963 Williams ................. G01N 1/38
73/864.34
(Continued)

FOREIGN PATENT DOCUMENTS

KR 20-0288371 Y1 9/2002
KR 10-2011-0127179 A 11/2011
(Continued)

OTHER PUBLICATIONS

Machine translation for priority document Korean Intellectual Property Office, Application No. 10-20160012620, filing Date Feb. 2, 2016 [retrieved from USPTO Global Dossier on Jul. 7, 2020] (Year: 2020).*

(Continued)

*Primary Examiner* — Craig J Price
(74) *Attorney, Agent, or Firm* — Womble Bond Dickinson (US) LLP

(57) ABSTRACT

A device for collecting air into an air collecting pipe through a hole having a certain size includes a diaphragm check valve having elasticity. The diaphragm check valve is opened due to a change in the pressure in the vicinity of an air layer during generation of air when gas accumulation occurs in a safety related system pipe of a power plant or in a general pipe.

7 Claims, 7 Drawing Sheets

(51) Int. Cl.
  *F17D 1/08* (2006.01)
  *F17D 3/00* (2006.01)
  *F16K 24/04* (2006.01)
  *F17D 1/00* (2006.01)
(52) U.S. Cl.
  CPC ............ *F16K 15/147* (2013.01); *F16K 24/04* (2013.01); *F17D 1/00* (2013.01); *F17D 1/08* (2013.01); *F17D 3/00* (2013.01); *Y10T 137/7879* (2015.04); *Y10T 137/8342* (2015.04); *Y10T 137/88054* (2015.04)
(58) Field of Classification Search
  CPC .... Y10T 137/87917; Y10T 137/88054; G21C 17/022; G21C 19/28; F16K 15/147; F16K 15/14; F16K 24/044; F16K 24/04; F16K 37/0016; B01D 19/0063; F17D 1/08; F17D 3/00; G21D 1/02; Y02E 30/40; G01N 2001/105; G01N 2001/2071; G01N 1/2042; G01N 1/2035
  USPC .... 137/467.5, 199, 197, 200, 171, 154, 843, 137/844, 845, 848, 849, 246, 557–559, 137/216, 216.2, 217, 218; 251/331
  See application file for complete search history.

(56) References Cited

U.S. PATENT DOCUMENTS

| | | | | |
|---|---|---|---|---|
| 3,101,619 A * | 8/1963 | Hunter | .................... | G01N 30/24 73/863.84 |
| 3,225,585 A * | 12/1965 | Wohnoutka | .............. | G01N 7/14 73/19.1 |
| 3,469,453 A * | 9/1969 | Nelson | ................. | G01N 1/2035 73/863.02 |
| 3,631,654 A * | 1/1972 | Riely | ..................... | A61M 5/165 96/6 |
| 3,812,722 A * | 5/1974 | Soudelier | ............ | G01N 1/2035 73/863.82 |
| 3,858,573 A * | 1/1975 | Ryan | ..................... | G01N 33/497 600/543 |
| 3,909,302 A * | 9/1975 | Mermelstein | ....... | H01M 2/1205 429/86 |
| 4,046,011 A * | 9/1977 | Olsen | .................... | F16K 15/141 73/864.35 |
| 4,329,869 A * | 5/1982 | Toda | ..................... | G01N 33/442 73/19.1 |
| 4,456,014 A * | 6/1984 | Buck | ...................... | A61B 5/097 128/205.12 |
| 4,558,709 A * | 12/1985 | Aida | ...................... | A61B 5/097 600/532 |
| 5,406,855 A * | 4/1995 | Welker | ................. | G01N 1/2035 73/863.83 |
| 5,636,019 A * | 6/1997 | Schoepe | ................ | G01N 21/49 356/338 |
| 5,970,805 A * | 10/1999 | Foody | ................... | G01N 1/2035 73/863.85 |
| 6,105,608 A | 8/2000 | Katzman | | |
| 6,357,304 B1 * | 3/2002 | Mayeaux | ............. | G01N 1/2035 73/863.12 |
| 6,761,757 B2 * | 7/2004 | Welker | ............... | B01D 46/0031 55/428 |
| 7,302,962 B2 * | 12/2007 | Blake, III | .............. | B60H 1/249 137/15.18 |
| 7,874,221 B1 * | 1/2011 | Mayeaux | ............. | G01N 1/2035 73/863.83 |
| 8,105,408 B2 * | 1/2012 | Thomas | ................ | F16K 15/144 454/270 |
| 8,721,461 B2 * | 5/2014 | LaMothe | ................ | F16D 3/223 137/849 |
| 8,776,822 B2 * | 7/2014 | McIntire | .................. | E03F 5/08 137/199 |
| 9,322,487 B2 * | 4/2016 | Wood, Jr. | ............. | G21C 17/022 |
| 9,995,658 B2 * | 6/2018 | Volker | .................... | G01K 5/483 |
| 10,157,688 B2 * | 12/2018 | Wood, Jr. | .............. | F16K 24/044 |
| 10,215,739 B1 * | 2/2019 | St. Amant, III | ... | B01D 39/2027 |
| 10,222,302 B1 * | 3/2019 | St Amant, III | ...... | G01N 1/2211 |
| 10,436,678 B1 * | 10/2019 | St Amant, III | ...... | G01N 1/2247 |
| 10,613,004 B1 * | 4/2020 | St Amant, III | ...... | G01N 1/2247 |
| 10,627,322 B1 * | 4/2020 | St Amant, III | ...... | G01N 33/225 |
| 2003/0084789 A1 * | 5/2003 | Kim | .................... | B01D 53/047 96/121 |
| 2003/0208132 A1 * | 11/2003 | Baddour | ................ | A61B 5/082 600/532 |
| 2004/0079236 A1 * | 4/2004 | Welker | ................. | B01D 46/543 96/413 |
| 2009/0178495 A1 * | 7/2009 | Steigmiller | ............ | C12M 37/02 73/863.72 |
| 2009/0293649 A1 * | 12/2009 | Zhang | ...................... | G01N 1/12 73/864.63 |
| 2010/0012201 A1 * | 1/2010 | Welker | .................. | F16K 15/028 137/535 |
| 2010/0124676 A1 * | 5/2010 | Meschter | ........... | B01D 19/0042 429/513 |
| 2010/0175183 A1 * | 7/2010 | Cannon | .................. | E03C 1/1225 4/679 |
| 2010/0208859 A1 | 8/2010 | Lois | | |
| 2011/0005629 A1 | 1/2011 | Ostrander et al. | | |
| 2011/0120577 A1 * | 5/2011 | Wood, Jr. | .............. | F16K 24/046 137/558 |
| 2012/0247595 A1 * | 10/2012 | Raftis | .................... | F16K 15/144 137/883 |
| 2014/0174212 A1 * | 6/2014 | Lundkvist | ................. | B01L 3/52 73/864.91 |

FOREIGN PATENT DOCUMENTS

| | | |
|---|---|---|
| KR | 20-0463549 Y1 | 11/2012 |
| KR | 101273323 | 6/2013 |
| KR | 10-1580569 B1 | 12/2015 |

OTHER PUBLICATIONS

Korean IP Office—International Search Report of the International Searching Authority with an English International Search Report dated Oct. 12, 2016 for International Application No. PCT/KR2016/001777 (5 pgs).
Korean IP Office—Written Opinion of the International Searching Authority dated Oct. 12, 2016 for International Application No. PCT/KR2016/001777 (5 pgs).

* cited by examiner

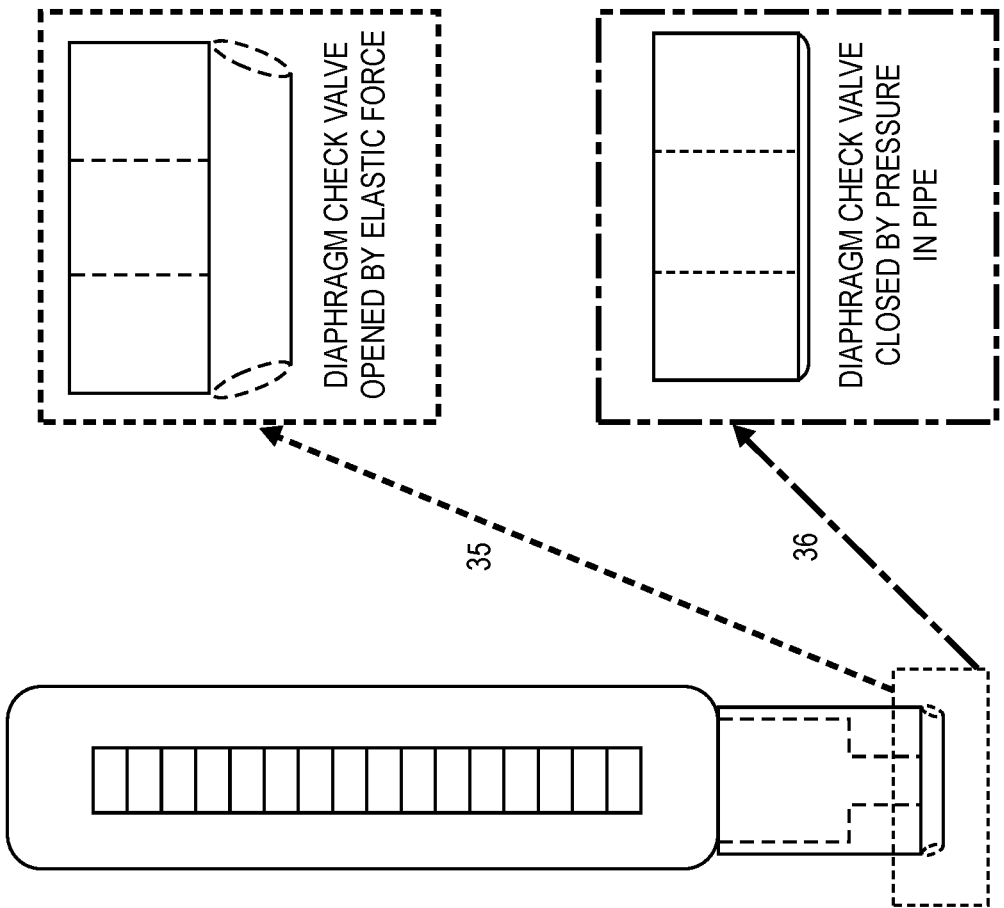
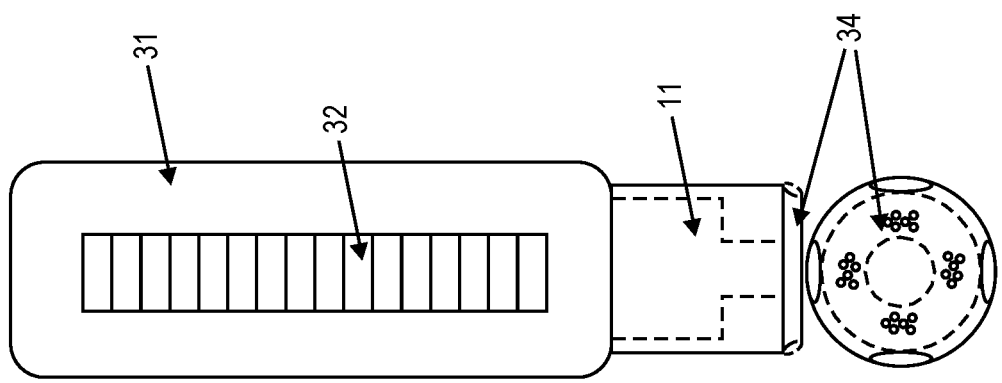
FIG. 4

DEVICE FOR COLLECTING AIR ACCUMULATED IN PIPE

CROSS-REFERENCE TO RELATED APPLICATIONS

This patent application is a U.S. National Phase application under 35 USC. § 371 of international Application No. PCT/KR2016/001777, filed on 24 Feb. 2016, entitled DEVICE FOR COLLECTING AIR ACCUMULATED IN PIPE, which claims priority to Korean Patent Application No. 10-2016-0012620, filed on 2 Feb. 2016.

TECHNICAL FIELD

The present disclosure relates to a device for collecting air into an air collecting pipe through a hole having a certain size, in which a diaphragm check valve having elasticity is opened due to a change in the pressure in the vicinity of an air layer during generation of air when gas accumulation occurs in a safety related system pipe of a power plant or in a general pipe.

BACKGROUND ART

Until now, domestically, there has been safety issues related to a gas accumulated problem in a safety related system pipe, and solutions and management plans have been provided through research projects. Among them, methods of measuring an amount of gas accumulation in a pipe or technologies to monitor a water level in the pipe when a gas is accumulated in the pipe in a long-term aspect have been developed.

In relation to these current issues, the present disclosure describes a method of collecting air in a pipe and measuring an amount of air with different approach, implementation method, and purpose in order to solve the current issues by a method different from the water level monitoring method.

In the case of a power plant, when air is continuously accumulated in a system including pipes, there may be a possibility of deteriorating safety of a power plant in pipe of a safety related system. Even in a general system, a functional deterioration effect may be caused. The present disclosure provides a solution to solve a problem when air accumulation occurs in a pipe by approaching the phenomenon related to air accumulation in a method different from the methods developed so far.

The goal of the present disclosure is to provide a principle of removing and collecting air from a pipe and a device for discharging collected air when accumulated to a certain level to prevent air accumulation after being installed in the pipe. Furthermore, a diaphragm check valve employed in the present disclosure is an important factor to be configured in the device of the present disclosure, which is another core factor developed in the present disclosure.

As those to be achieved in the present disclosure, parts and ideas are described for better understanding thereof, and efficient merits and features of the present disclosure are to be described.

Korean Patent Laid-Open Publication No. 10-2012-0000057 discloses an apparatus and method for collecting a gas during electrolysis, and Korean Patent Laid-Open Publication No. 10-2012-0028894 discloses an improved method of collecting carbon during fermentation. These are different from the technical features and effects of "a device for collecting air in a pipe using a diaphragm check valve" which is a core content of the present disclosure.

SUMMARY

It is an object of the present disclosure to provide a device which is capable of collecting air and removing collected air when the air is accumulated to a certain amount, to prevent the air from being accumulated in a pipe and a nuclear power plant.

In accordance with one aspect of the present disclosure, there is provided a device for collecting air in a pipe, the device being installed at one side of the pipe: including a collecting pipe provided at one side of the pipe to collect air in the pipe; a diaphragm check valve provided under the collecting pipe and configured to operate as a pressure balance is broken by an air layer existing in the pipe; and a collected air storing unit configured to store the air coming through the diaphragm check valve and the collecting pipe.

In accordance with another aspect of the present disclosure, there is provided a device for collecting air in a pipe in which an elastic force of the diaphragm check valve is driven when a pressure difference is generated as air comes in due to a pressure fluctuation generated owing to the air layer in the pipe and fine dents formed in holes of the diaphragm, and as a check valve is opened by the elastic force, the air in the pipe may come into the collecting air storing unit via the check valve.

In accordance with further another aspect of the present disclosure, there is provided a device for collecting air in a pipe in which the diaphragm check valve is provided between an inner wall and an outer wall of the pipe by penetrating walls of the pipe.

According to the present disclosure, without taking any special action to gas accumulation in a pipe of a safety related system or a general system, when air is generated in the pipe, the air is removed and collected and an amount of collected air is indicated so that, when air is continuously collected through a collector, safety of a power plant may be continuously secured and a function deterioration effect may not be caused.

DESCRIPTION OF DRAWINGS

FIG. 4 is an overall configuration view of an air collector according to the present disclosure, wherein in the right side of FIG. 4, there is shown an open state and a closed state of the diaphragm check valve.

DETAILED DESCRIPTION

Figure 1:
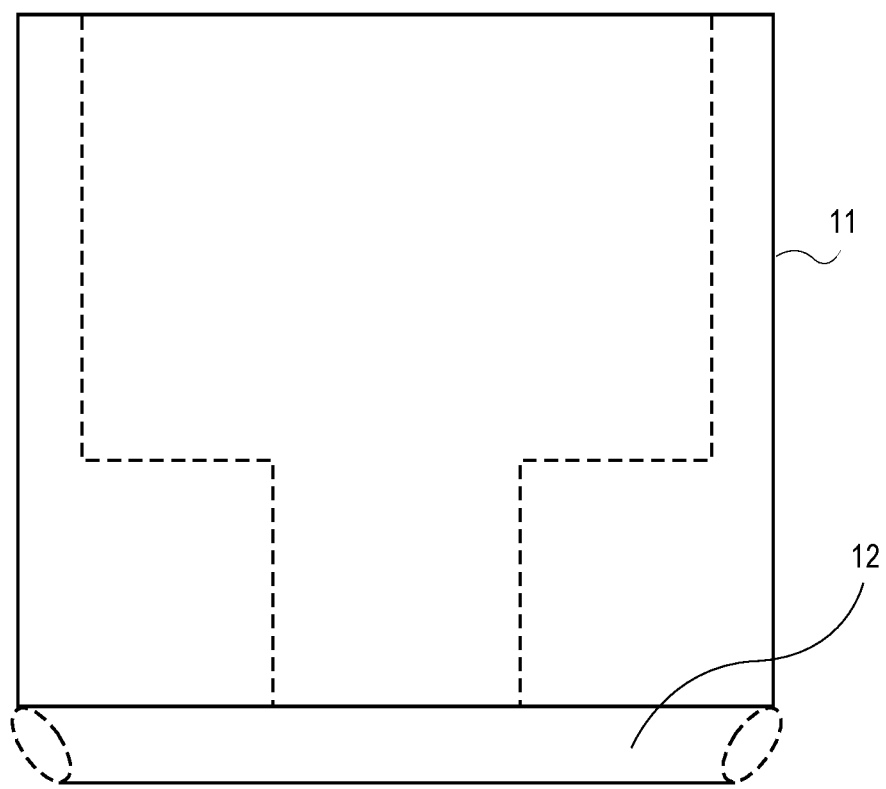
FIG. 1 is a side view of a diaphragm check valve for air collection installed at one side of a pipe, according to the present disclosure.

A device for collecting air in a pipe, the device being installed at one side of the pipe, may include a collecting pipe provided at one side of the pipe to collect air in the pipe; a diaphragm check valve provided under the collecting pipe and configured to operate as a pressure balance is broken by an air layer existing in the pipe; and a collected air storing unit configured to store the air coming through the diaphragm check valve and the collecting pipe.

A detailed content for implementing the present disclosure is presented below.

The shape of a diaphragm check valve or a configuration method of an overall system or a device is presented as an example in the present disclosure, and a shape similar thereto or the principle of the present disclosure may be construed to be included in claims of the present application.

The present disclosure describes a device for collecting air into an air collecting pipe through a hole having a certain size, in which a diaphragm check valve having elasticity is opened due to a change in the pressure in the vicinity of an air layer during generation of air when gas accumulation occurs in a safety related system pipe of a power plant or in a general pipe.

The present disclosure describes a device that guides air generated in a pipe toward an air collecting pipe and stores the air in a collected air storing unit by using a feature that a diaphragm check valve of a metal material having elasticity is opened or closed.

A diaphragm check valve is characteristically a round circular diaphragm, has elasticity to be flexible, and has an oval hole formed in an edge thereof. It is ideal that the shape of the hole or the number of holes is such that an area taken by the hole to an entire area of a diaphragm is within about 45%. Such an area ratio maintains an interval of at least 3 mm to about 5 mm from a collection pipe when the elasticity of diaphragm is appropriately kept. When the interval is kept, the diaphragm check valve is opened. The diaphragm is opened in an appropriate response to a pressure difference generated when air passes in a pipe. When the diaphragm check valve is opened, that is, air passes through a pipe, air escapes via the hole of diaphragm into the air collecting pipe. Furthermore, the escaped air is confined in the collected air storing unit above the pipe.

The collected air storing unit above the pipe is normally filled with water, thereby preventing a flow of air in an upper side thereof.

The diaphragm check valve having elasticity to be flexible is closed at a very fast speed because an area taken by the hole of the edge of the diaphragm is at least ¼ or less, when a certain pressure is formed in the pipe. In this state, the diaphragm check valve may maintain a closed state. In general, when no air is formed and the pressure in the pipe is within an operating range of the pipe, that is, air is not generated, the diaphragm check valve may continuously maintain a closed state.

The method of the disclosure may be summarized into four steps. First step is starting driving and operation/system of a power plant. When a pressure is applied to a pipe after initial water filling, the diaphragm check valve maintains an automatic closed state due to a fluid pressure increase effect.

Second step is exerting the elasticity of the diaphragm by behavior in which, while the fluid under pressure flows, an air layer is contained in the fluid or air is generated in the fluid, thereby generating a pressure change by the air layers, and a pressure balance is broken by the hole at an edge of the diaphragm check valve and air of the air layer enters through the hole at the edge and very small holes (a diameter of about 1 mm to about 3 mm) inside the diaphragm. Due to an instant restoration of the elasticity of the diaphragm, air comes from the pipe. Preferably, the diameter is about 2 mm.

Third step is collecting the air coming from the pipe into the collected air storing unit through the air collecting pipe.

Fourth step is discharging the air collected in the collected air storing unit through a discharge hole of the collected air storing unit.

The structure and operation principle of the device are described below.

Figure 2:
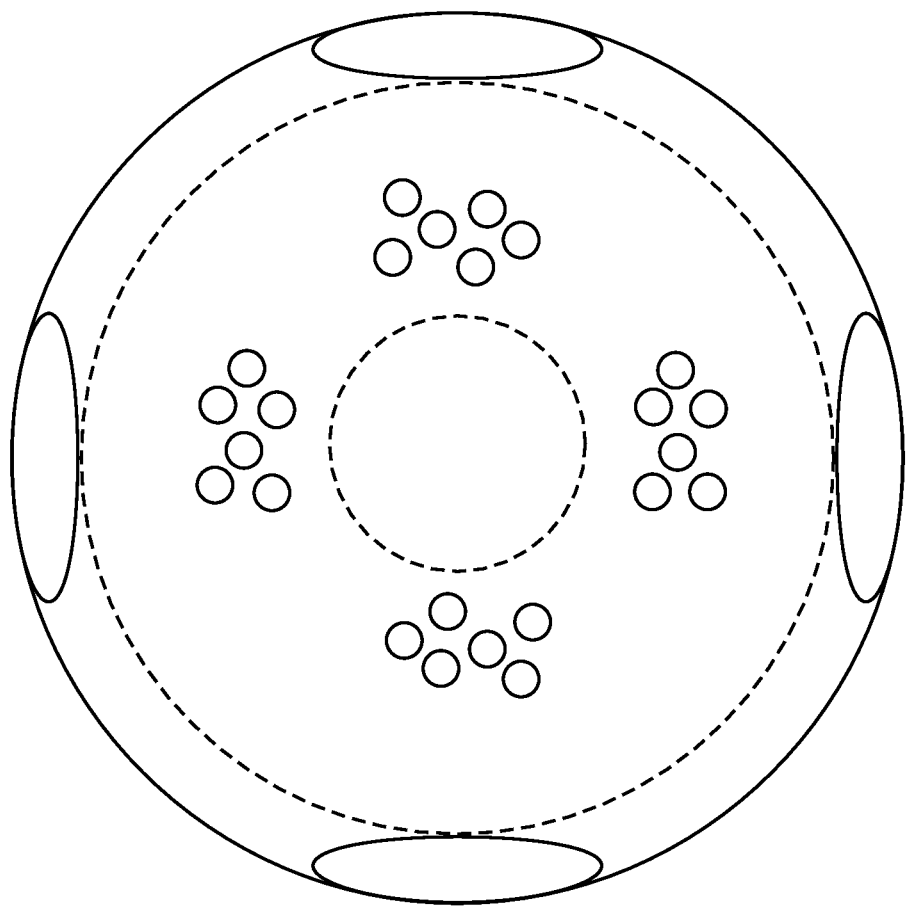
FIG. 2 is a bottom view of a diaphragm check valve for air collection installed at one side of a pipe, according to the present disclosure.
Figure 3:
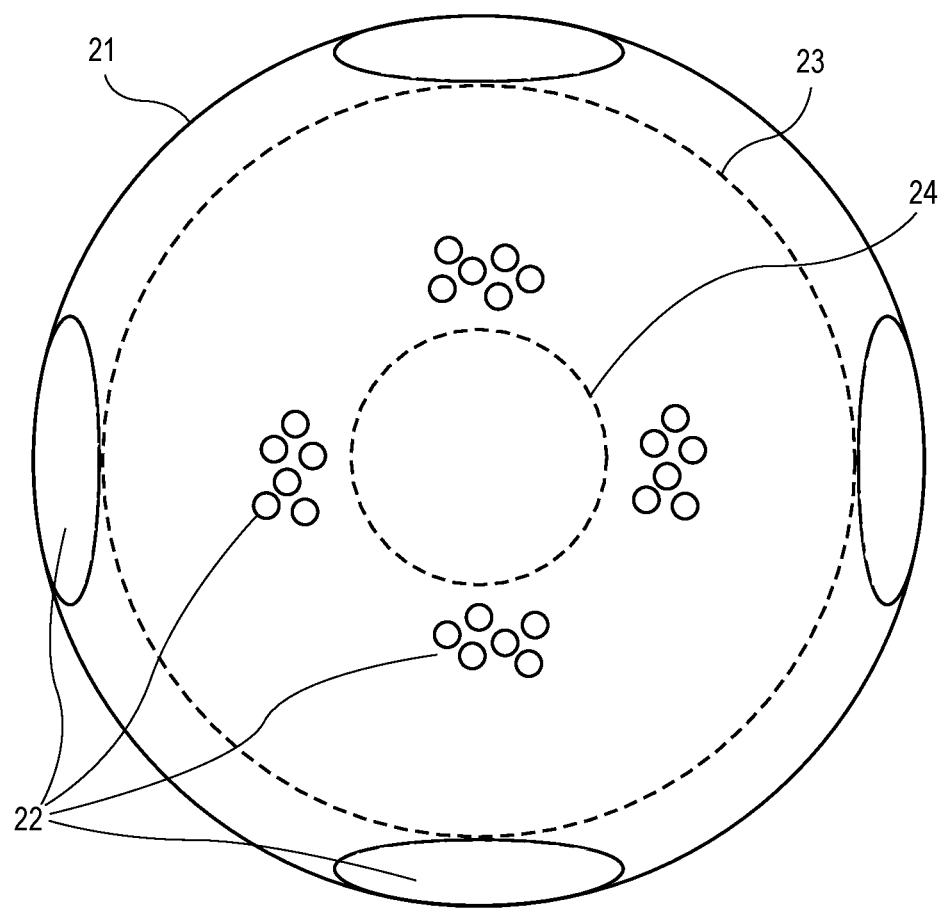
FIG. 3 is a magnified view of the diaphragm check valve shown in FIG. 2.
Figure 5:
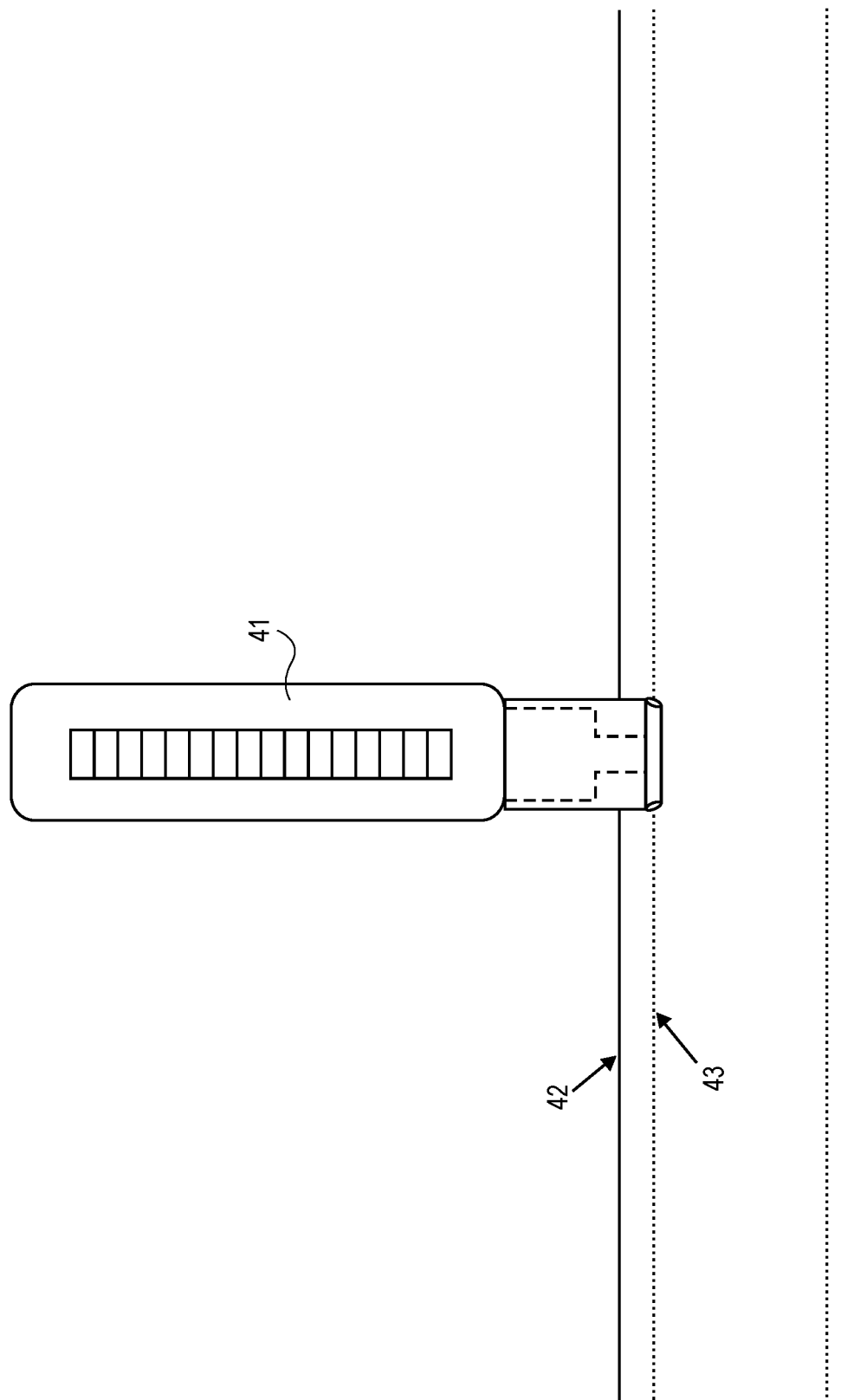
FIG. 5 is a conceptual view of the device of the present disclosure being installed on a pipe which is filled with water.

FIG. 1 is a side view of an air collecting pipe and a diaphragm check valve. FIG. 2 is an overall structural view showing a shape viewed from the bottom. FIG. 3 is a magnified view of a diaphragm of a diaphragm check valve, when viewed from the bottom, for explaining the area of the diaphragm and the area of a hole. FIG. 4 illustrates a device including an air collector, wherein in the right side of FIG. 4, there is shown an open state and a closed state of the diaphragm check valve. FIG. 5 is a conceptual view of the device of the present disclosure being installed on a pipe which is filled with water, which is a conceptual view showing that, by a pressure during operation, when an air layer passes in a pipe when the diaphragm check valve is closed, the diaphragm check valve is opened to remove the air.

FIG. 1 illustrates the arrangement of constituent elements of a device showing a basic structure of a core factor. In FIG. 1, the device includes a collecting pipe 11 that guides air coming through the diaphragm check valve toward a collected air storing unit 31 (see FIG. 4). The device includes a diaphragm check valve 12 formed of a metal material having elasticity. When the diaphragm check valve 12 of FIG. 1 is opened, the diaphragm check valve 12 may maintain a very small interval of about 3 mm to about 5 mm from the air collecting pipe. The opening by an elastic force may remove air in the upper side of the pipe to the outside. FIG. 2 illustrates the diaphragm check valve of FIG. 1 projected from the bottom, to fit to the diameter of the collecting pipe. The role of the diaphragm having elasticity in the check valve is conceptually very important. The area of the diaphragm is larger than the area of a hole by about 55% or more. Accordingly, when the pressure increases or a system pressure is applied, the diaphragm may be rapidly and easily closed because the area of the diaphragm is greater than the area of the hole. During a normal operation, a general pressure of a system always allows for the diaphragm to be closed because the diaphragm receives a pressure in an area greater than the area of the hole, and thus the diaphragm may appropriately perform an interface role between the pipe and the outside. Also, when an air layer passes, pressure balance may be broken. At this time, air enters through the hole and thus an elastic force of the diaphragm is driven. Thus, the diaphragm check valve maintains an open state while air passes, thereby removing the air.

FIG. 3 is a magnified view by projecting the diaphragm check valve from the bottom. In FIG. 3, a reference numeral 21 denotes a diaphragm area of the diaphragm check valve. The diaphragm are not only forms a boundary between the pipe and the collecting pipe/air collector, but also removes air of the air collector from the pipe during a normal operation or enables an ordinary operator to have a regular check and process air discharge, and acts as a boundary of a system to prevent a system water of a pipe from directly coming to the air collector.

In FIG. 3, a reference numeral 22 denotes large holes located at the edge of the diaphragm and very small holes (having a diameter of about 2 mm or less) located around an inner diameter of the air collecting pipe. According to design, the entire area of a hole may be ideally about 45% compared to the area of the diaphragm to maintain a closed state during a normal operation of a system. In particular, fine dents are formed in the small holes. When water passes in the pipe, the water does not react to the fine dents due to a surface tension. However, when air passes there through, the air may very rapidly enter over the closed diaphragm through the fine dents. When air passes, with the above effect, a fluctuation of pressure may break the balance of pressure due to the air coming from the close diaphragm. This may provide a driving force to open the check valve from the elastic force of the diaphragm. The air generated in the pipe is easily removed toward the collecting pipe. In FIG. 3, a reference numeral 23 denotes a line projecting a large inner diameter of the collecting pipe in the upper side, and a reference numeral 24 denotes a line projecting a small inner diameter of the collecting pipe in the lower side in an area directly contacting the diaphragm.

FIG. 4 illustrates the entire configuration of the device when operating. In FIG. 4, reference numerals 31, 32, 33, and 34 illustrate components that form a unitary device, and reference numerals 35 and 36 illustrates magnified views of the diaphragm check valve when opened and closed.

FIG. 5 illustrates application of a device of a system for air collecting/air measuring and discharging implemented in the present disclosure.

Figure 6:
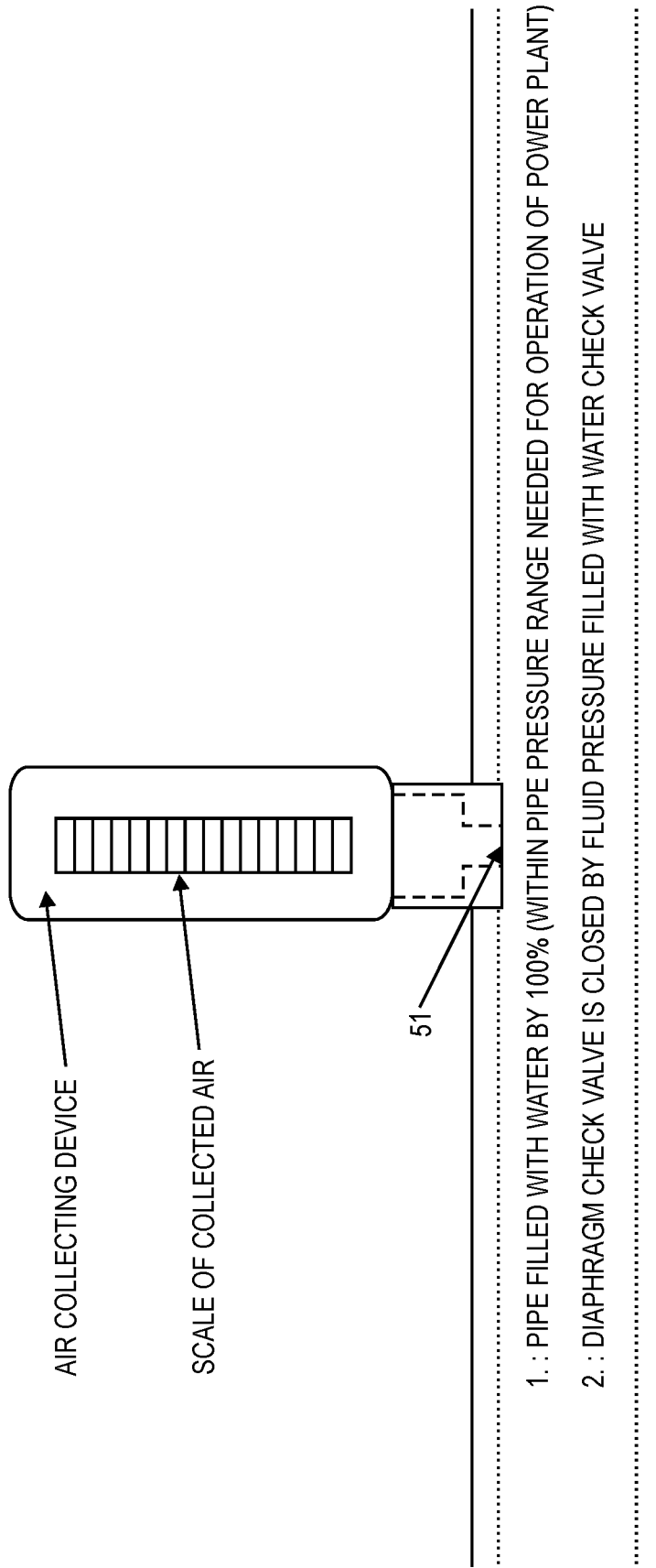
FIG. 6 illustrates a "middle" portion indicated by a reference numeral 51.

FIG. 5 illustrates the concept and operation when a unitary device is established, including all functionalities described in FIGS. 1 to 4. When the device is configured as illustrated in FIG. 4, the device is mounted in a pipe. When the device is mounted in the pipe, a shape corresponding to the "high" of FIG. 5 is made. In FIG. 5, reference numerals 41, 42, and 43 indicate a portion corresponding to "high". As illustrated in FIG. 5, when the diaphragm check valve is mounted by penetrating through a wall of the pipe to be located between an inner wall and an outer wall of the pipe, preparation for collecting and discharging of air during air accumulation in the pipe is completed. In FIG. 6, a reference numeral 51 indicates a "middle" portion. The inside of the pipe is filled with water, and the diaphragm check valve is closed due to the pressure by the operation of a system.

Figure 7:
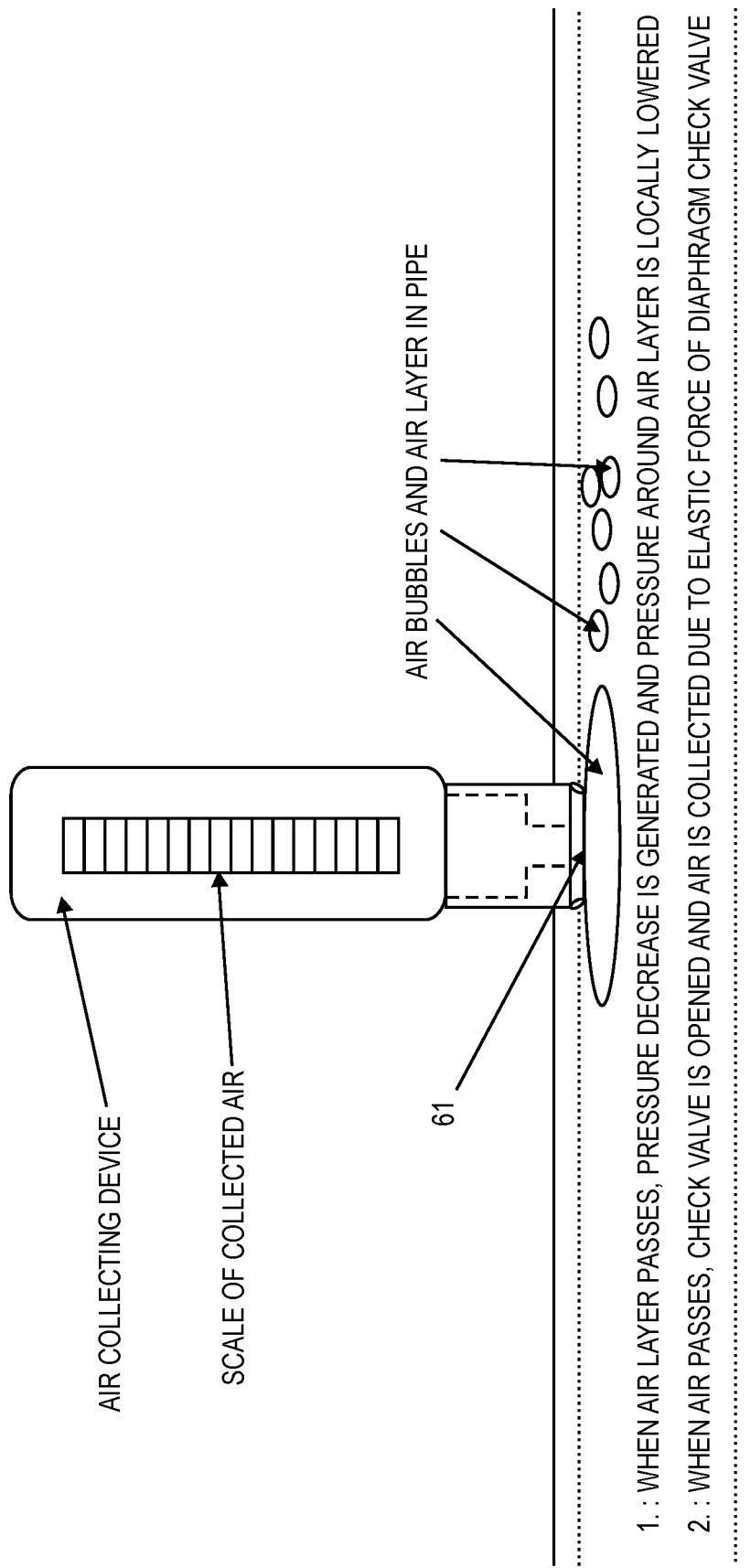
FIG. 7 illustrates a "low" portion indicated by a reference numeral 61.

The diaphragm performs a boundary between the system and the outside. In FIG. 7, a reference numeral 61 indicates a portion corresponding to "low". When air passes in the pipe, the air comes in by pressure fluctuation generated by the air layer in the pipe and the fine dents formed inside the hole of the diaphragm, and thus the pressure balance (when a pressure difference is generated) is broken and the elastic force of the diaphragm check valve is driven and the check valve is opened by the elastic force. Accordingly, the air in the pipe comes into the collecting air storing unit via the check valve, and thus the air is removed. The air to be removed escapes from the upper side of the pipe that through the open holes of the diaphragm check valve and collected in the collected air storing unit in the upper side. An amount of the air collected to a certain amount is discharged at an appropriate time by checking a scale.

The inside of the pipe is filled with water, and the diaphragm check valve is closed due to the pressure by the operation of a system and performs a boundary between the system and the outside. In FIG. 7, a portion where the check valve exists is a portion corresponding to "low". When air passes through the pipe, the air comes in by pressure fluctuation generated by the air layer and the fine dents formed inside the hole of the diaphragm, and thus the pressure balance is broken and the elastic force of the diaphragm check valve is driven and the check valve is opened, thereby removing the air in the pipe. The removed air is the air in the upper side of the pipe that passes through the open holes of the diaphragm check valve and collected in the collected air storing unit in the upper side.

An amount of the air collected in collected air storing unit is discharged by checking a scale marked on the collected air storing unit and when the amount is higher than a set scale.

The present disclosure has a very high industrial applicability because the present disclosure provides a device for collecting air into an air collecting pipe through a hole having a certain size, in which a diaphragm check valve having elasticity is opened due to a change in the pressure in the vicinity of an air layer during generation of air when gas accumulation occurs in a safety related system pipe of a power plant or in a general pipe. Thus, when air is continuously collected, safety of a power plant is continuously secured and a function deterioration effect may not be caused.

What is claimed is:

1. A device for collecting air in a pipe, the device being installed at one side of the pipe, the device comprising:
   a collecting pipe provided at the one side of the pipe to collect air in the pipe;
   a diaphragm check valve provided at an end of the collecting pipe and configured to operate as a pressure balance is broken by an air layer existing in the pipe, the diaphragm check valve including at least one hole near an edge of the diaphragm check valve, wherein the diaphragm check valve is provided between an inner wall of the pipe and an outer wall of the pipe by penetrating the inner wall and the outer wall of the pipe; and
   a collected air storing unit configured to store the air coming through the diaphragm check valve and the collecting pipe;
   wherein the collecting pipe has a first section with a first diameter and a second section with a second diameter, the first section being nearest the side of the pipe and the first diameter being smaller than the second diameter, and
   wherein the diaphragm check valve includes a plurality of holes positioned between a projection of the first diameter onto the diaphragm and a projection of the second diameter onto the diaphragm.

2. The device of claim 1, wherein an elastic force of the diaphragm check valve is driven when a pressure difference is generated as air comes in due to a pressure fluctuation generated owing to the air layer existing in the pipe, and
   as the diaphragm check valve is opened by the elastic force, the air in the pipe comes into the collecting air storing unit via the check valve.

3. The device of claim 1, wherein the collected air storing unit has a scale indicating an amount of the collected air marked thereon.

4. The device of claim 1, wherein the diaphragm check valve has a diaphragm in which small holes for collecting air are formed, and wherein the diaphragm is provided on a front surface of the diaphragm check valve.

5. The device of claim 1 wherein an area of a diaphragm of the diaphragm check valve is larger than an area of the hole by 55% or more.

6. The device of claim 1 wherein the at least one hole near the edge of the diaphragm check valve is bigger than any individual hole of the plurality of holes positioned in the diaphragm between the projection of the first diameter and the projection of the second diameter.

7. The device of claim 1 wherein a combined area of the at least one hole near the edge of the diaphragm check valve and the plurality of holes positioned at the first diameter is 45 percent of an area of the diaphragm check valve.

* * * * *